United States Patent
Kowalkowski et al.

(10) Patent No.: US 8,720,187 B2
(45) Date of Patent: May 13, 2014

(54) EXHAUST DIAGNOSTIC CONTROL SYSTEM AND METHOD WITH SELECTIVE DISABLEMENT OF NOX REDUCTION EFFICIENCY DIAGNOSTIC

(75) Inventors: Janean E. Kowalkowski, Northville, MI (US); Justin A. Shetney, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 170 days.

(21) Appl. No.: 13/465,069

(22) Filed: May 7, 2012

(65) Prior Publication Data

US 2013/0291517 A1 Nov. 7, 2013

(51) Int. Cl.
| | |
|---|---|
| *F01N 3/00* | (2006.01) |
| *F01N 3/02* | (2006.01) |
| *F01N 3/20* | (2006.01) |
| *B60T 7/12* | (2006.01) |
| *G05D 1/00* | (2006.01) |
| *G06F 7/00* | (2006.01) |
| *G06F 17/00* | (2006.01) |
| *G01M 15/00* | (2006.01) |

(52) U.S. Cl.
USPC .............. 60/277; 60/299; 60/301; 701/109; 701/114; 73/114.69; 73/114.73

(58) Field of Classification Search
USPC ................ 60/277, 299, 301; 701/109, 114; 73/114.69, 114.71
See application file for complete search history.

(56) References Cited

U.S. PATENT DOCUMENTS

| 7,003,944 B2* | 2/2006 | Surnilla et al. | 60/285 |
| 7,854,161 B2* | 12/2010 | Hjorsberg et al. | 73/114.75 |
| 8,424,292 B2* | 4/2013 | Hoyte et al. | 60/286 |
| 2007/0227518 A1* | 10/2007 | West et al. | 123/673 |

* cited by examiner

*Primary Examiner* — Thomas Denion
*Assistant Examiner* — Dapinder Singh
(74) *Attorney, Agent, or Firm* — Cantor Colburn LLP

(57) ABSTRACT

An exhaust diagnostic control system comprises a test enabling module, an exhaust gas temperature management module in communication with the test enabling module, and a component management module configured for executing a test for determining a reduction efficiency associated with the after-treatment component. The test enabling module is configured for assessing a reliability of an estimated level of reductant load on an after-treatment component, and, based on the reliability, selectively facilitating disablement of a subsequent test for determining an efficiency of NOx reduction in the after-treatment component. The exhaust gas temperature management module is configured for selectively adjusting a temperature of the after-treatment component to a predetermined temperature range using intrusive exhaust gas temperature management. The test for determining reduction efficiency comprises determining a NOx reduction efficiency of the after-treatment component.

20 Claims, 3 Drawing Sheets

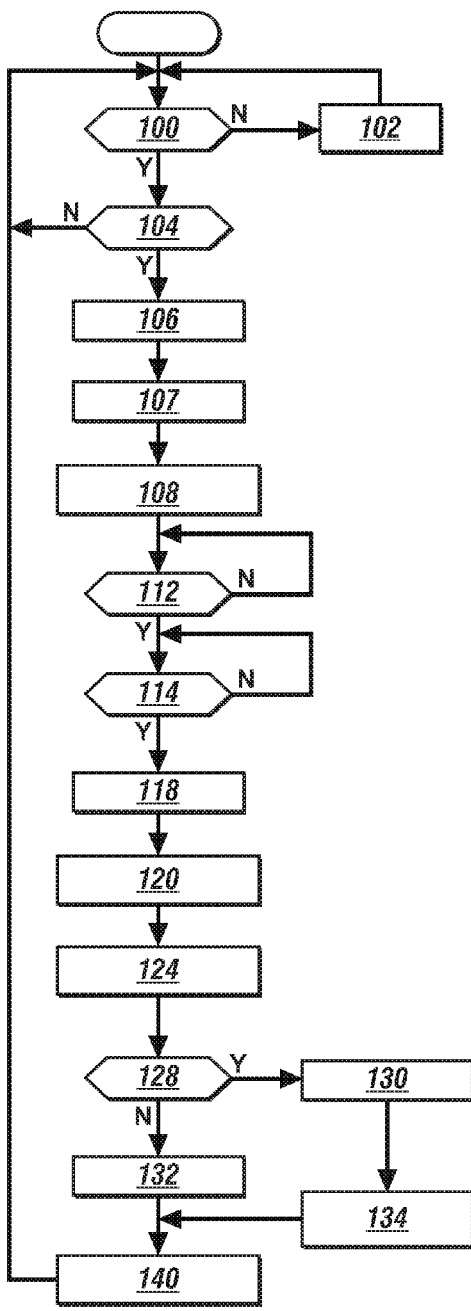
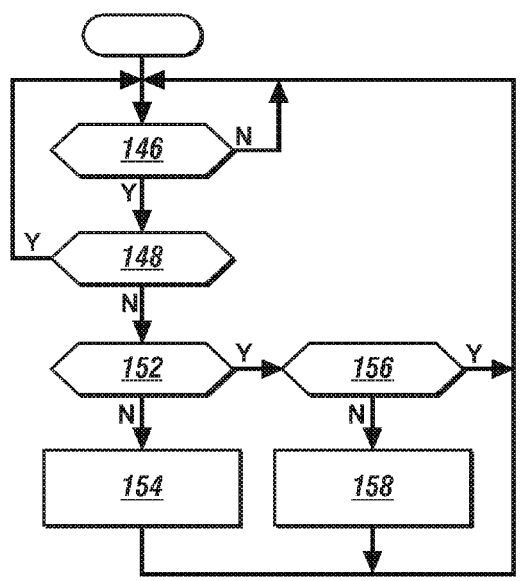
FIG. 3
FIG. 4

EXHAUST DIAGNOSTIC CONTROL SYSTEM AND METHOD WITH SELECTIVE DISABLEMENT OF NOX REDUCTION EFFICIENCY DIAGNOSTIC

FIELD OF THE INVENTION

The subject invention relates to vehicle exhaust systems, and more particularly to exhaust diagnostic and control systems and methods that evaluate and control performance of after-treatment components and processes.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

During combustion in a diesel engine, an air/fuel mixture is delivered through an intake valve to cylinders and is compressed and combusted therein. After combustion, pistons force the exhaust gas in the cylinders into an exhaust system. The exhaust gas may contain oxides of nitrogen (NOx) and carbon monoxide (CO).

Exhaust gas treatment systems may employ catalysts in one or more components configured for accomplishing an after-treatment process such as reducing nitrogen oxides (NOx) to produce more tolerable exhaust constituents of nitrogen (N2) and water (H2O). Reductant may be added to the exhaust gas upstream from an after-treatment component, such as a selective catalyst reduction (SCR) component, and, for example only, the reductant may include anhydrous ammonia (NH3), aqueous ammonia or urea, any or all of which may be injected as a fine mist into the exhaust gas. When the ammonia, mixed with exhaust gases, reaches the after-treatment component, the NOx emissions are broken down. A Diesel Particulate Filter (DPF) may then capture soot, and that soot may be periodically incinerated during regeneration cycles. Water vapor, nitrogen and reduced emissions exit the exhaust system.

To maintain efficient NOx reduction in the after-treatment component, a control may be employed so as to maintain a desired quantity of the reductant (i.e., reductant load) in the after-treatment component. As exhaust gas containing NOx passes through the after-treatment component, the reductant is consumed, and the load is depleted. A model may be employed by the control to track and/or predict how much reductant is loaded in the after-treatment component and to inject additional reductant as required so as to maintain an appropriate reductant load for achieving a desired effect such as reduction of NOx in the exhaust stream.

It has been noted that predictions for reductant loads on after-treatment components, such as SCR catalysts, can be inaccurate following a service regeneration event. Service regeneration of a DPF is often conducted with exhaust gas temperatures at elevated levels. Because of these increased temperatures, it is often necessary to maintain a flow of reductant through the injector(s), dosing valves, or other after-treatment hardware in order to prevent thermal damage.

While the reductant load model may track the quantity of reductant that is injected, the model may have difficulty determining how much of the reductant actually accumulates on the SCR catalyst. At the high temperatures associated with a service regeneration event, reductant may be carried out of the system with the exhaust stream or may be oxidized. Accordingly, it can be difficult to predict how much of the reductant injected during service regeneration is oxidized or otherwise consumed in the after-treatment component and how much may have survived and accumulated so as to contribute to the loading of the after-treatment component.

As a consequence, model estimates of ammonia load may be inaccurate, and may thus be rendered unreliable. In particular, experience has shown that following the occurrence of certain events, such as a DPF service regeneration event, load estimates based on models may deviate substantially from observed levels of NH3 load on the after-treatment component. Hence, diagnostic processes based on measurement and evaluation of NOx reduction efficiencies in the after-treatment component may produce erroneous results such as where more reductant is actually loaded on the after-treatment component than the diagnostic system assumes based on the inaccuracies in the model. Such conditions may cause NH3 slip, which may cause some cross-sensitive sensors to misinterpret the presence of NH3 as NOx. Similarly, where an actual NH3 load is substantially lower than the model estimate, the incorrect NH3 load can cause a poorer than expected NOx reduction efficiency to be assessed by the diagnostic system, potentially resulting in an incorrect diagnosis and invocation of remedial measures to be taken.

Accordingly, it is desirable to provide a system and method for selectively disabling NOx reduction efficiency diagnostics during time periods when the accuracy of reductant load predictions are assessed as being unreliable so as to avoid inappropriate initiation of remedial measures when such measures are not warranted.

SUMMARY OF THE INVENTION

In one exemplary embodiment of the invention, an exhaust diagnostic control system comprises a test enabling module, an exhaust gas temperature management module in communication with the test enabling module, and a component management module configured for executing, when the test enabling module deems a reliability of an estimated level of reductant load on an after-treatment component to be within a range of acceptability, a test for determining a reduction efficiency associated with the after-treatment component. The test enabling module is configured for executing a process for assessing a reliability of an estimated level of reductant load on an after-treatment component, and, based on the reliability, selectively facilitating disablement of a subsequent test for determining an efficiency of NOx reduction in the after-treatment component. The exhaust gas temperature management module is configured for selectively adjusting a temperature of the after-treatment component to a predetermined temperature range using intrusive exhaust gas temperature management. The test for determining reduction efficiency comprises determining a NOx reduction efficiency of the after-treatment component.

In another exemplary embodiment of the invention, a method for diagnosing an exhaust system comprises executing a process for assessing a reliability of an estimated level of reductant load on an after-treatment component, and, based on the reliability of estimated levels of reductant load on the after-treatment component, selectively facilitating disablement of a subsequent test for determining an efficiency of NOx reduction in the after-treatment component. The process also includes selectively adjusting a temperature of the after-treatment component to a predetermined temperature range using intrusive exhaust gas temperature management. When the test enabling module deems a reliability of an estimated level of reductant load on an after-treatment component to be within a range of acceptability, a reduction efficiency associated with the after-treatment component is determined by determining a NOx reduction efficiency of the after-treatment component.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 3 illustrates a method for resetting an exhaust diagnostic control system upon the occurrence of one or more triggering criteria according to the present disclosure; and FIG. 4 illustrates a method for controlling the temperature of a catalyst of an after-treatment component.

DESCRIPTION OF THE EMBODIMENTS

Figure 1:
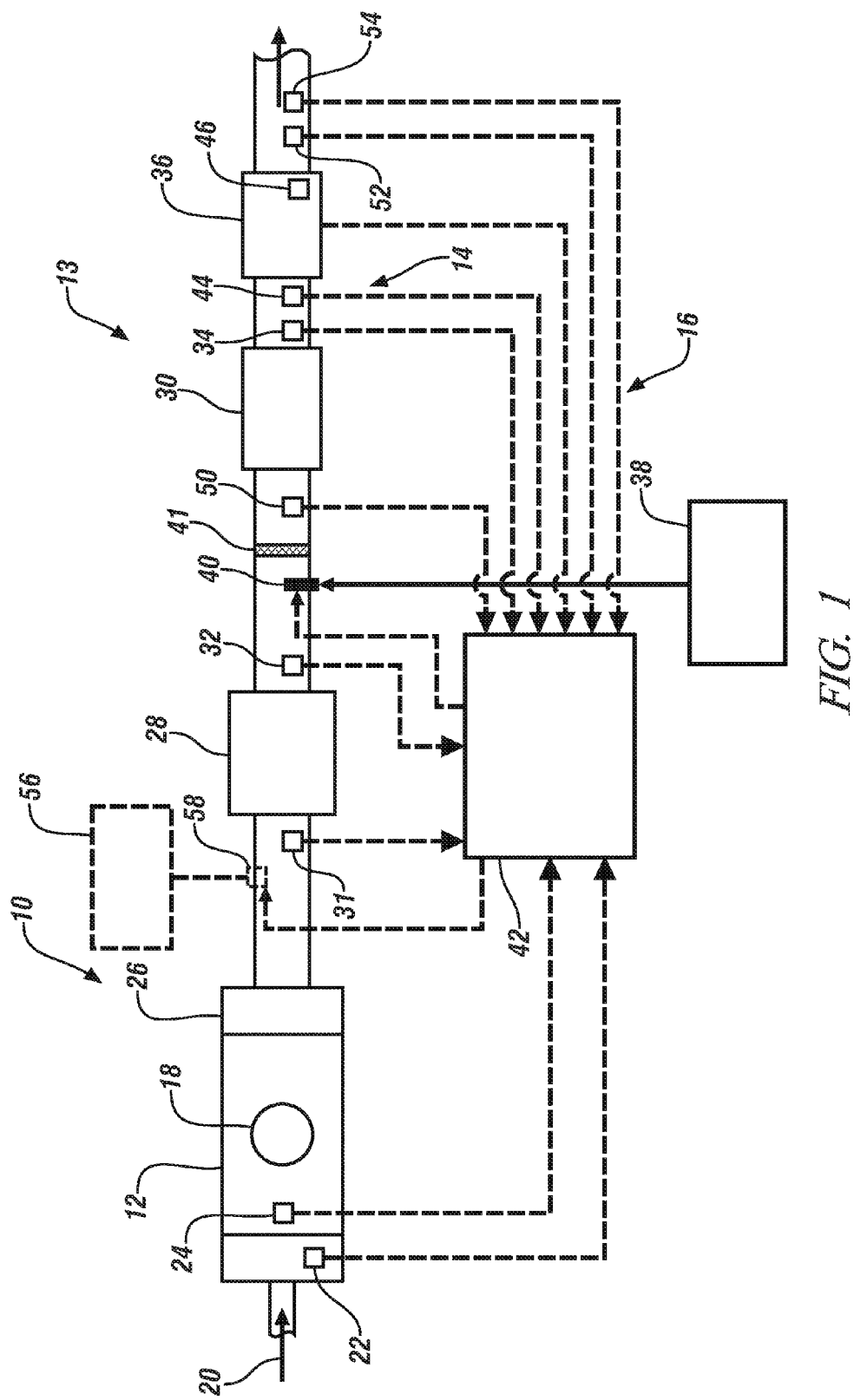
FIG. 1 is a functional block diagram of an engine control system including an exhaust diagnostic control system that automatically resets upon the occurrence of one or more triggering criteria according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term "module" refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

While the following disclosure involves diesel engines, other types of engines such as gasoline engines, including direct injection engines, may benefit from the teachings herein.

In accordance with an exemplary embodiment of the invention, the present disclosure provides a system and method for selectively disabling NOx reduction efficiency diagnostics during time periods when the accuracy of reductant load predictions are assessed as being unreliable so as to avoid inappropriate initiation of remedial measures when such measures are not warranted. An exemplary system and method for diagnosing and controlling operation of an after-treatment component assesses reliability of reductant load estimates in high risk situations and, when appropriate, facilitates the suspension of remedial measures which would likely be inappropriate if the diagnostic control system and method were to predict and rely upon reductant loads in those situations. Thus, rather than proceeding with diagnostic control measures based on suspect load estimates, the system is enabled to continue operating as if there were no significant changes in NOx reduction efficiency. Normal operation of the diagnostic control system may be resumed so as to include updated assessments of NOx reduction efficiencies as soon as reliability is restored to the load estimates.

Upon an assessment suggesting the reliability of the load estimate is suspect, and therefore, that a sufficiently substantial risk exists that an actual reductant load in an after-treatment component fails to match a load predicted by a load model, further assessments of NOx reduction efficiency in the after-treatment component are suspended (i.e., disabled). Triggering criteria associated with elevated risk of unreliable load estimates may include a determination that the load is greater than a threshold limit, such as a calibration limit.

In some embodiments, reliability may be restored to the load estimates by waiting until re-calibrating the model responsible for creating those predictions. Such a recalibration is accomplished by establishing a known reductant load in or on the after-treatment component. In some embodiments, this is achieved by first depleting reductant of the after-treatment component and subsequently re-loading the after-treatment component with reductant under conditions corresponding to high load model reliability and accuracy. Conditions of increased load model reliability and accuracy are typically characterized by operation of the engine system under normal operating conditions such that the load model may be correlated to empirical data. Reductant may be depleted by operating the engine system with reductant dosing maintained at relatively low levels or completely off. Execution of a regeneration event with little or no dosing may also be effective to reliably consume the reductant load in the after-treatment component. When the reductant load can reliably be assumed to be within an acceptable tolerance of a known level, e.g., zero, the reductant load is therefore re-established, and the model may be considered to have been re-calibrated or otherwise re-set so that its prediction for reductant load is reliable.

The sufficient depletion of reductant can be confirmed by comparing information signals produced by the upstream and downstream NOx sensors so as to verify that any detectable difference between their outputs is within an acceptable level. In addition, or in the alternative, an algorithm based on empirical experience may be used to determine the extent of the depletion. For example, for a particular system, operation of the system may have been sufficiently characterized that rates of reductant consumption may be understood for certain operating conditions. Accordingly, the procedure provides assurance that the load of reductant is at a known level. After the NH3 load has been depleted, normal dosing can be commenced to re-establish a known (i.e., reliably predictable by the NH3 load model) NH3 load on the NOx catalyst.

With the model having been re-calibrated, normal control functions can be executed with improved accuracy and reliability. Therefore, upon an assessment the reliability of the load estimate is restored, and therefore, that the likelihood that an actual reductant load in an after-treatment component is within an acceptable tolerance of a load predicted by a load model, assessments of NOx reduction efficiency in the after-treatment component are resumed. If remedial measures are subsequently deemed appropriate by the diagnostic control system, they can be undertaken with improved confidence that they are warranted.

Referring now to FIG. 1, a diesel engine system 10 is schematically illustrated. The diesel engine system 10 includes a diesel engine 12 and an exhaust treatment system 13. The exhaust treatment system 13 further includes an exhaust system 14 and a dosing system 16. The diesel engine 12 includes a cylinder 18, an intake manifold 20, a mass air flow (MAF) sensor 22 and an engine speed sensor 24. Air flows into the diesel engine 12 through the intake manifold 20 and is monitored by the MAF sensor 22. The air is directed into the cylinder 18 and is combusted with fuel to drive pistons (not shown). Although a single cylinder 18 is illustrated, it can be appreciated that the diesel engine 12 may include additional cylinders 18. For example, diesel engines having 2, 3, 4, 5, 6, 8, 10, 12 and 16 cylinders are anticipated.

Exhaust gas is produced inside the cylinder 18 as a result of the combustion process. The exhaust system 14 treats the exhaust gas before the exhaust gas is released to atmosphere. The exhaust system 14 includes an exhaust manifold 26 and a diesel oxidation catalyst (DOC) 28. The exhaust manifold 26 directs exhaust exiting the cylinder through the DOC 28. The exhaust is treated within the DOC 28 to reduce the emissions. The exhaust system 14 further includes an after-treatment component 30, a temperature sensor 31, an inlet temperature sensor 32, an outlet temperature sensor 34 and a particulate filter (PF) 36. In an exemplary embodiment, after-treatment component 30 is a selective catalyst reduction (SCR) component.

The temperature sensor 31 may be positioned between the engine and the DOC 18. The inlet temperature sensor 32 is located upstream from the after-treatment component 30 to monitor the temperature change at the inlet of the after-treatment component 30. The outlet temperature sensor 34 is located downstream from the after-treatment component 30 to monitor the temperature change at the outlet of the after-treatment component 30. Although the exhaust treatment system 13 is illustrated as including the inlet and outlet temperature sensors 32, 34 arranged outside the after-treatment component 30, the inlet and outlet temperature sensors 32, 34 can be located inside the after-treatment component 30 to monitor the temperature change of the exhaust at the inlet and outlet of the after-treatment component 30. The PF 36 further reduces emissions by trapping particulates (i.e., soot) in the exhaust gas.

The dosing system 16 includes a dosing injector 40 that injects reductant from a reductant supply 38 into the exhaust gas. The reductant mixes with the exhaust gas and further reduces the emissions when the mixture is exposed to the after-treatment component 30. A mixer 41 may be used to mix the reductant with the exhaust gas upstream from the after-treatment component 30. A control module 42 regulates and controls the operation of the engine system 10.

An exhaust gas flow rate sensor 44 may generate a signal corresponding to the flow of exhaust in the exhaust system. Although the sensor is illustrated between the after-treatment component 30 and the PF 36, various other locations within the exhaust system may be used for measurement including downstream from the exhaust manifold and upstream from the after-treatment component 30. A temperature sensor 46 generates a particulate filter temperature corresponding to a measured particulate filter temperature. The temperature sensor 46 may be disposed on or within the PF 36. The temperature sensor 46 may also be located upstream or downstream from the PF 36.

Other sensors in the exhaust system may include an upstream NOx sensor 50 that generates a NOx signal based on a concentration of NOx present in the exhaust system. A downstream NOx sensor 52 may be positioned downstream from the PF 36 to measure a concentration of NOx leaving the PF 36. In addition, an ammonia (NH3) sensor 54 generates a signal corresponding to the amount of ammonia within the exhaust gas. The NH3 sensor 54 is optional, but can be used to simplify the control system due to the ability to discern between NOx and NH3. Alternately and/or in addition, a hydrocarbon (HC) supply 56 and a HC injector 58 may be provided to supply HC in the exhaust gas reaching the DOC catalyst.

Figure 2:
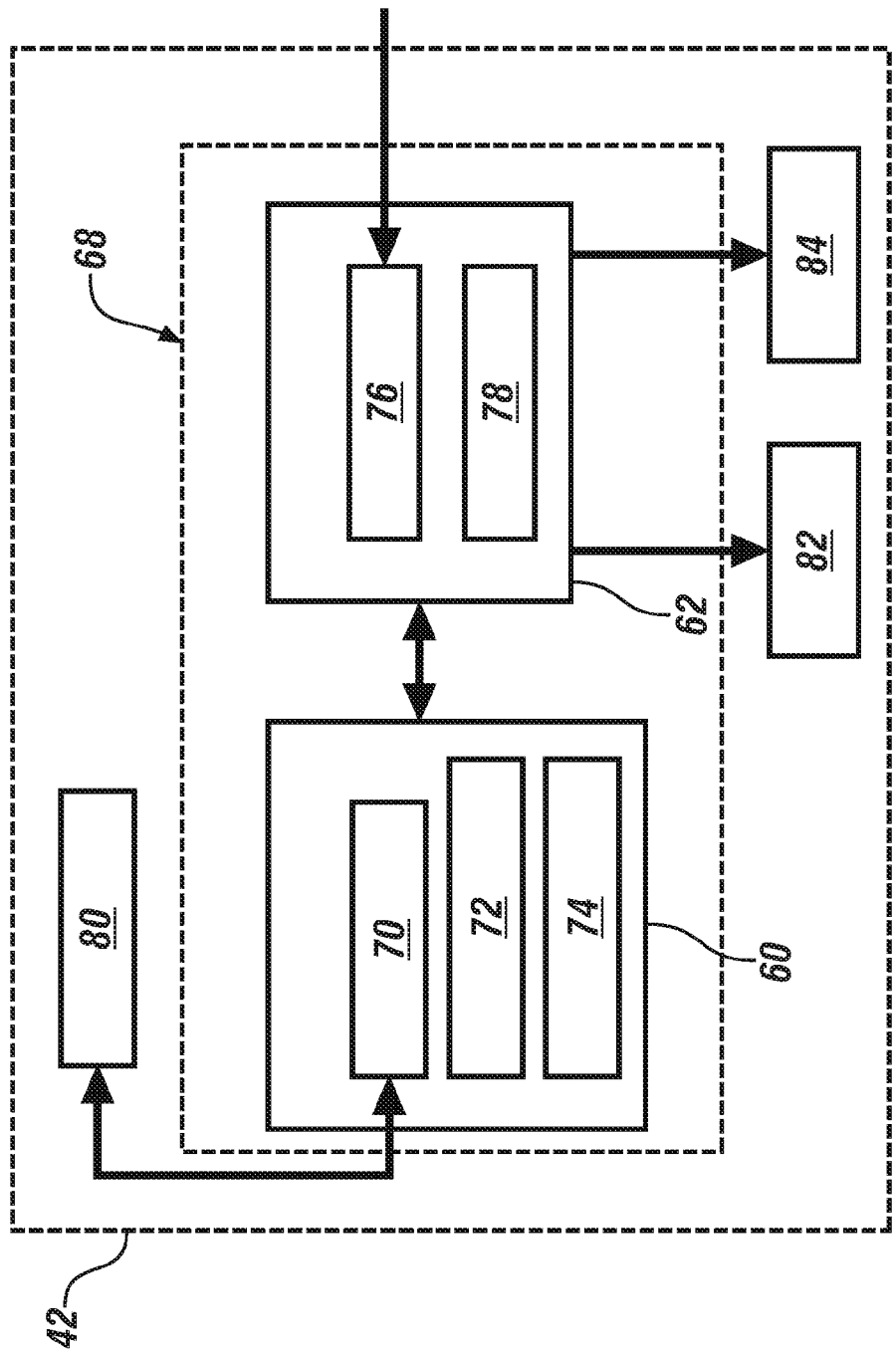
FIG. 2 is a functional block diagram of an exemplary implementation of a control module of the exhaust diagnostic control system of FIG. 1.

Referring now to FIG. 2, the control module 42 may include a component management module 60 that is used to monitor performance (e.g., conversion efficiency of NOx) of an after-treatment component 30 and/or to facilitate control over operation of the after-treatment component 30. The control module 42 further includes an exhaust gas temperature management module 62 that intrusively controls a temperature of the after-treatment component 30.

The component management module 60 includes a reset module 70 and a test initiation module 72. As used herein, the term intrusive means that the control module 42 varies the control of the engine outside of the operating conditions to allow the test to occur. The test initiation module 72 initiates an intrusive NOx reduction efficiency test in the after-treatment component after the occurrence of a trigger event, such as a recent failure of a prior NOx reduction efficiency test or the passage of a prescribed period of time or another milestone, and/or the undertaking of other remedial action.

The intrusive test initiation module 72 sends a signal to the exhaust gas temperature management module 62 to initiate intrusive temperature control of the after-treatment component prior to a NOx reduction efficiency test in the after-treatment component. The test enabling module 74 ensures that enable conditions are met prior to initiation of testing or control functions.

The exhaust gas temperature management module 62 includes an after-treatment component temperature calculating module 76 that calculates a temperature of the after-treatment component. The temperature calculating module 76 may calculate the temperature of the after-treatment component based on the inlet temperature sensor 32, the outlet temperature sensor 34, a model or any other suitable method. For example only, the temperature calculating module 76 may calculate the temperature of the after-treatment component based on values from both the inlet and outlet temperature sensors 32, 34. For example only, the temperature calculating module 76 may calculate the temperature based on an average or a weighted average of the inlet and outlet temperature sensors 32, 34.

The control module 42, the component management module 60 and/or the exhaust gas temperature management module 62 may include an operating parameter adjustment module 78 that adjusts other operating parameters prior to the intrusive NOx reduction efficiency test. For example, other operating parameters such as dosing, reductant load, EGR, and/or other conditions may also be adjusted within corresponding windows prior to the intrusive NOx reduction efficiency test.

The control module 42 includes a vehicle speed limiting module 80 that limits vehicle speed after the NOx reduction efficiency falls below a predetermined threshold. The control module 42 further includes a fueling control module 82 that determines fuel quantity, fuel injection timing, post injection, etc. When in the intrusive NOx reduction efficiency test mode, the exhaust gas temperature management module 62 adjusts fueling. The fueling adjustment increases temperature of the after-treatment component. Alternately, a hydrocarbon injection module 84 injects fuel into the exhaust upstream from the DOC catalyst 28 to generate an exotherm to increase the temperature in the after-treatment component.

Thus, in an exemplary embodiment, an exhaust diagnostic control system 68 comprises a test enabling module 74, an exhaust gas temperature management module 62, and an exhaust diagnostic control system 68. The test enabling module 74 is configured for executing a process for assessing reliability and/or accuracy of reductant load predictions. In an exemplary embodiment, the test enabling module 74 is configured for for assessing reliability and/or accuracy of reductant load predictions in high risk situations such as where a sufficiently substantial risk exists that an actual reductant load in an after-treatment component would fail to match a load predicted by a load model.

For example, existence of elevated risk of unreliable load estimates may be based on a comparison of the predicted load to a threshold limit such as a calibrated limit, and a determination that the load is greater than the limit. Other indicators may comprise detection of excessively low or high NOx reduction efficiency associated with the after-treatment component 30, an instance of a service regeneration event having occurred in the recent past, or a sensed deviation between sensed NOx concentration in the exhaust stream and predicted NOx concentration in the exhaust stream.

An assessment of such risk may also be based on engine or system operating conditions. For example, a data-based or model-based correlation may be developed between operating conditions and risk of inaccurate load predictions. To facilitate such a correlation, conditions associated with elevated risk of unreliable load estimates may be developed and characterized based on experience. For example, risk may be characterized as unreasonably high following time intervals when the engine system is operated under abnormal or non-standard operating conditions such that no reliable data (e.g., empirical data, theoretical data) exists against which to calibrate the load model.

The exhaust gas temperature management module 62 is configured for selectively adjusting a temperature of the after-treatment component 30 to a predetermined temperature range using intrusive exhaust gas temperature management. Accordingly, an exemplary exhaust gas temperature management module 62 may be configured for restoring reliability and/or accuracy to the model load estimates. For example, an exemplary exhaust gas temperature management module 62 may execute a process for reliably depleting a reductant load to a level below a predetermined threshold and subsequently establishing a known concentration of reductant on the after-treatment component 30. The process for depleting a reductant load may comprise executing a regeneration event. The process for depleting a reductant load may also comprise commanding dosing off until the load of reductant has been depleted from the after-treatment component 30 to a level below a predetermined threshold.

The component management module 60 is configured for executing a NOx reduction efficiency test when commanded to do so. The NOx reduction efficiency test comprises determining a NOx reduction efficiency associated with the after-treatment component 30. The component management module 60 also facilitates suspending or disabling the NOx reduction efficiency test whenever such disablement or suspension is deemed appropriate by the test enabling module 74. In an exemplary embodiment, the test enabling module 74 executes a process for facilitating suspension of the NOx reduction efficiency test whenever certain criteria related to the assessment of elevated risk of unreliable load estimates is made. Accordingly, in connection with the assessment of risk, the test enabling module 74 quantifies the risk and compares it to a threshold limit. When the limit is exceeded, the test enabling module 74 either signals the component management module 60 to suspend execution of the NOx reduction efficiency test when commanded or, refrains from signaling the component management module 60 to execute the NOx reduction efficiency test. When the limit is not exceeded, the test enabling module 74 either signals the component management module 60 to continue or to resume execution of the NOx reduction efficiency test or, refrains from signaling the component management module 60 to suspend the NOx reduction efficiency test.

The test initiation module 72 is configured for executing a process for evaluating the extent to which NOx are reduced in the after-treatment component 30. The test initiation module 72 is configured for executing a process for evaluating the extent to which reductant has been depleted from the after-treatment component 30 or for executing a process for comparing an information signal reflecting a NOx concentration upstream from the after-treatment component 30 to a NOx concentration downstream from the after-treatment component 30 and determining whether the difference between the NOx concentration upstream from the after-treatment component 30 and the NOx concentration downstream from the after-treatment component 30 is less than or equal to a predetermined limit.

Referring now to FIG. 3, control begins at 100 where it is determined whether an intrusive NOx reduction efficiency test, or another component diagnostic test, needs to be executed based on satisfaction of one or more prescribed conditions. For example only, the intrusive after-treatment component diagnostic test (which may also be used to deduce reductant quality) may be executed after the vehicle is placed in a speed-limited mode and/or other remedial action is taken following a failure to pass a prior NOx reduction efficiency test.

If 100 is false, control proceeds in a normal mode at 102. If 100 is true, control continues at 104 and determines whether a first set of conditions are acceptable to run the test. For example only, the first set of conditions may include ensuring that regeneration of the PF 36 is not being performed. PF regeneration is typically performed when soot builds up in the PF 36. Additionally, the first set of conditions may include ensuring that adaptation is not being performed. Adaptation occurs when there is a problem with the after-treatment component such that a difference between a downstream NOx sensor measurement and an expected NOx level based on a model exceeds a predetermined tolerance level. Still further, the set of conditions includes an assessment of the reliability of the load model predictions associated with the after-treatment component. Other conditions may be used in the first set of conditions instead of, or in addition to, these conditions.

If 104 is false, control returns to 100. If 104 is true, control continues at 106 and optionally disables exhaust gas recirculation (EGR). Optionally, control may execute a process for restoring reliability to the load model estimates. In an exemplary embodiment, reliability may be restored by depleting and reestablishing the load. Accordingly, at 107, control activates a process for depleting a reductant load to establish a reliable reductant load on the after-treatment component. The process for depleting a reductant load includes commanding dosing at a reduced level (e.g., off) until the reductant load has been sufficiently depleted from the after-treatment component (i.e., the algorithm determines that the reductant load on the after-treatment component has been depleted to a level less than a predetermined threshold). Optionally, a regeneration test may be initiated so as to more quickly deplete the reductant load. The sufficient depletion of reductant can be confirmed by comparing information signals produced by the upstream and downstream NOx sensors so as to verify that any detectable difference between their outputs is within an acceptable level. In addition, the load model can be observed so as to ensure that it indicates that the after-treatment component is unloaded. In an exemplary embodiment, unloading may take up to 30 minutes. After the reductant load has been depleted, and/or depletion is predicted or confirmed, dosing can be re-commenced to re-establish a known (i.e., reliably predictable by the reductant load model) load on the after-treatment component. Thereafter, normal dosing may be resumed.

At 108, so long as an acceptable level of accuracy and/or reliability has been assessed with respect to the load predictions, the control activates an intrusive NOx reduction efficiency test to achieve a predetermined temperature range for the after-treatment component. Control also turns dosing on at 108. At 112, control determines whether there is a sufficient reductant load on the after-treatment component (i.e., the catalyst) 30 and whether the load estimate is reliable. A time delay may be used to ensure that the sufficient reductant load has reliably been re-established so as to reliably provide a predictable and acceptable level of NOx conversion.

If 112 is false, control waits until there is a sufficient and reliable estimate of reductant load on the after-treatment component. At 114, control determines whether a second set of enable conditions have been met. For example only, the second set of enable conditions may include one or more of the following conditions: exhaust flow within a predetermined range; upstream NOx mass flow within a predetermined range; upstream NOx concentration within a predetermined range and/or NOx sensors ready, and acceptable level of reliability for the load model predictions. Still other conditions may be included in the second set of enable conditions.

At 118, control measures an efficiency of the NOx conversion/reduction process in the after-treatment component. At 120, control generates an efficiency of the NOx reduction (i.e., conversion) process as a function of upstream and downstream accumulated masses. At 124, control generates an efficiency threshold as a function of upstream NOx, exhaust mass flowrate, and after-treatment component temperature. The efficiency threshold may be expressed as a percentage.

At 128, control determines whether the efficiency of the NOx conversion process is greater than or equal to the efficiency threshold. If 128 is true, control declares an approval status (which may be interpreted as signaling acceptable reductant quality and/or after-treatment component operation based on acceptable NOx reduction efficiency) at 130. If 128 is false, control declares an unacceptable condition (which may be interpreted as an unacceptable reductant quality and/or an unacceptable after-treatment component operation based on an unacceptable NOx reduction efficiency) at 132. In the event of a declaration of an unacceptable condition, remedial measures may be undertaken such as illumination of a warning light or initiation of modifications to the manner in which the after-treatment component and/or the engine and/or the vehicle is operated. Upon declaration of an approval status, control continues from 130 with 134 and disables whichever failure mode may have caused the initiation of the intrusive test. For example, the vehicle speed limiting mode and/or other remedial measures are ended. Control continues from 132 and 134 with 140 where control ends intrusive exhaust gas temperature management and enables EGR (if previously disabled).

Referring now to FIG. 4, an intrusive exhaust gas temperature management method is shown. At 146, control determines whether the intrusive NOx reduction efficiency test is running. If 146 is false, control returns to 146. If 146 is true, control continues at 148 where control determines whether the after-treatment component temperature is within a predetermined temperature range (for example, between a minimum temperature TLo and a maximum temperature THi).

If 148 is true, control returns to 146. If 148 is false, control determines whether the after-treatment component temperature is greater than the minimum temperature TLo at 152. If 152 is false, control increases the exhaust temperature in any suitable manner. For example, the exhaust temperature can be increased by altering fueling (fuel quantity, fuel injection timing, post injection, etc.), airflow (intake throttle. EGR valve, and/or turbocharger vane position), and/or by starting or increasing HC injection at 154. Control returns to 146.

If 152 is true, control determines whether the after-treatment component temperature is less than the maximum temperature THi at 156. If 156 is false, control decreases the exhaust temperature in any suitable manner. For example, the exhaust temperature can be decreased by altering fueling (fuel quantity, fuel injection timing, post injection, etc.), airflow (intake throttle. EGR valve, and/or turbocharger vane position), and/or by stopping or decreasing HC injection at 158. Control returns to 146. If 156 is true, control returns to 146.

Thus, a method for diagnosing an exhaust system comprises assessing a reliability of an estimated level of reductant load on an after-treatment component (step 107). The method also comprises facilitating suspension and/or resumption of a NOx reduction efficiency based on the assessment of reliability of the load prediction. Still further, the method comprises selectively adjusting a temperature of the after-treatment component to a predetermined temperature range using intrusive exhaust gas temperature management (step 108) and executing a NOx reduction efficiency test comprising determining a NOx reduction efficiency associated with an after-treatment component (step 118). Exhaust gas temperature can be controlled, for example, by adjusting levels of fuel in the exhaust gas. The process for assessing reliability of the reductant load (step 107) may comprise a process for restoring reliability to the estimates such as by executing a regeneration event. The process for restoring reliability may also include commanding dosing off until the load of reductant has been depleted from the after-treatment component to a level below a predetermined threshold.

The method may also comprise evaluating the extent to which NOx are reduced in the after-treatment component and/or evaluating the extent to which reductant has been depleted from the after-treatment component (step 118). The method may also comprise comparing an information signal reflecting a NOx concentration upstream from the after-treatment component to a NOx concentration downstream from the after-treatment component and determining whether the difference between the NOx concentration upstream from the after-treatment component and the NOx concentration downstream from the after-treatment component is less than or equal to a predetermined limit.

By assessing the reliability of the prediction for load of NH3 of the after-treatment component, and disabling the NOx reduction efficiency test whenever the reliability of the load estimates are suspect, and further by providing the abilities to restore reliability to the load model estimates and subsequently resume NOx efficiency testing, the control can reliably ensure that the NH3 load estimate is accurate and can ensure that after-treatment diagnostic tests are performed at times and under conditions that facilitate reliable knowledge of the NH3 load present on the after-treatment catalyst. This increases the robustness of the after-treatment efficiency diagnostic and avoids the inappropriate initiation of unnecessary remedial measures such as false warning light illumination or overzealous DEF Quality Inducement on vehicles after a DPF Service Regen has been performed. As a result, better control over emission components, engine systems, and vehicles may be enabled, and customer satisfaction may be improved, warranty costs may be reduced, and confusion may be reduced.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust diagnostic control system, comprising:
a test enabling module comprising a processor coupled to a memory, the test enabling module configured for executing a process for assessing a reliability of an estimated level of reductant load on an after-treatment component, and, based on said reliability of estimated levels of reductant load on the after-treatment component, selectively facilitating disablement of a subsequent test for determining an efficiency of NOx reduction in the after-treatment component;
an exhaust gas temperature management module comprising a processor coupled to a memory, the exhaust gas temperature management module, in communication with the test enabling module and configured for selectively adjusting a temperature of the after-treatment component to a predetermined temperature range using intrusive exhaust gas temperature management; and
a component management module comprising a processor coupled to a memory, the component management module configured for executing, when the test enabling module deems a reliability of an estimated level of reductant load on an after-treatment component to be within a range of acceptability, a test for determining a reduction efficiency associated with the after-treatment component, the test for determining a reduction efficiency comprising determining a NOx reduction efficiency of the after-treatment component.

2. An exhaust diagnostic control system as in claim 1, wherein the reliability of the estimated level of reductant load on an after-treatment component is based on an operating condition of the after-treatment component.

3. An exhaust diagnostic control system as in claim 1, wherein the reliability of the estimated level of reductant load on an after-treatment component is based on an occurrence of a service regeneration event.

4. An exhaust diagnostic control system as in claim 1, wherein the reliability of the estimated level of reductant load on an after-treatment component is based on an elevated risk of an uncontrolled or unknown quantity of ammonia loaded on the after-treatment component.

5. An exhaust diagnostic control system as in claim 1, wherein the reliability of the estimated level of reductant load on an after-treatment component is based on a sensed deviation between a sensed NOx concentration and a predicted NOx concentration.

6. An exhaust diagnostic control system as in claim 1, wherein the process for assessing the reliability of an estimated level of reductant load on an after-treatment component comprises executing a process for restoring reliability to the estimated level of reductant load on the after-treatment component.

7. An exhaust diagnostic control system as in claim 6, wherein the process for restoring reliability to the estimated level of reductant load on the after-treatment component comprises depleting a reductant load on the after-treatment component.

8. An exhaust diagnostic control system as in claim 7, wherein the process for restoring reliability to the estimated level of reductant load on the after-treatment component comprises commanding dosing off until a load of reductant has been depleted from the after-treatment component to a level below a predetermined threshold.

9. An exhaust diagnostic control system as in claim 1, wherein the test enabling module is configured for executing a process for evaluating an extent to which NOx are reduced in the after-treatment component.

10. An exhaust diagnostic control system as in claim 9, wherein the test enabling module is configured for executing a process for comparing an information signal reflecting a NOx concentration upstream from the after-treatment component to a NOx concentration downstream from the after-treatment component and determining whether a difference between the NOx concentration upstream from the after-treatment component and the NOx concentration downstream from the after-treatment component is less than or equal to a predetermined limit.

11. A method for diagnosing an exhaust system comprising:
executing a process for assessing a reliability of an estimated level of reductant load on an after-treatment component, and, based on said reliability of the estimated levels of reductant load on the after-treatment component,
selectively facilitating disablement of a subsequent test for determining an efficiency of NOx reduction in the after-treatment component;
selectively adjusting a temperature of the after-treatment component to a predetermined temperature range using intrusive exhaust gas temperature management; and
when the reliability of the estimated level of reductant load on an after-treatment component is deemed to be within a range of acceptability, determining a reduction efficiency associated with the after-treatment component, said determining the reduction efficiency comprising determining the NOx reduction efficiency of the after-treatment component.

12. A method for diagnosing an exhaust system as in claim 11, wherein the reliability of the estimated level of reductant load on an after-treatment component is based on an operating condition of the after-treatment component.

13. A method for diagnosing an exhaust system as in claim 11, wherein the reliability of the estimated level of reductant load on an after-treatment component is based on an occurrence of a service regeneration event.

14. A method for diagnosing an exhaust system as in claim 11, wherein the reliability of the estimated level of reductant load on an after-treatment component is based on an elevated risk of an uncontrolled or unknown quantity of ammonia loaded on the after-treatment component.

15. A method for diagnosing an exhaust system as in claim 11, wherein the reliability of the estimated level of reductant load on an after-treatment component is based on a sensed deviation between a sensed NOx concentration and a predicted NOx concentration.

16. A method for diagnosing an exhaust system as in claim 11, wherein assessing reliability of an estimated level of reductant load on an after-treatment component comprises executing a process for restoring reliability to the estimated level of reductant load on the after-treatment component.

17. A method for diagnosing an exhaust system as in claim 11, wherein restoring reliability to the estimated level of reductant load on the after-treatment component comprises depleting a reductant load on the after-treatment component.

18. A method for diagnosing an exhaust system as in claim 11, further comprising restoring reliability to the estimated level of reductant load on the after-treatment component comprises commanding dosing off until a load of reductant has been depleted from the after-treatment component to a level below a predetermined threshold.

19. A method for diagnosing an exhaust system as in claim 11, further comprising evaluating an extent to which NOx are reduced in the after-treatment component.

20. A method for diagnosing an exhaust system as in claim 18, further comprising comparing an information signal reflecting a NOx concentration upstream from the after-treatment component to a NOx concentration downstream from the after-treatment component and determining whether a difference between the NOx concentration upstream from the after-treatment component and the NOx concentration downstream from the after-treatment component is less than or equal to a predetermined limit.

* * * * *